US012780285B2

(12) United States Patent
Weston et al.

(10) Patent No.: US 12,780,285 B2
(45) Date of Patent: Nov. 3, 2026

(54) FORCE SENSING STEERING WHEEL PADDLES

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US); Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 17/897,797

(22) Filed: Aug. 29, 2022

(65) Prior Publication Data

US 2024/0067254 A1 Feb. 29, 2024

(51) Int. Cl.
*B62D 1/04* (2006.01)
*B60G 17/02* (2006.01)
*B60G 17/08* (2006.01)

(52) U.S. Cl.
CPC ........... *B62D 1/046* (2013.01); *B60G 17/025* (2013.01); *B60G 17/08* (2013.01); *B60G 2500/10* (2013.01); *B60G 2500/30* (2013.01); *B60G 2600/20* (2013.01)

(58) Field of Classification Search
CPC ...... B62D 1/046; B60G 17/025; B60G 17/08; B60G 2500/10; B60G 2500/30; B60G 2500/20
See application file for complete search history.

(56) References Cited

U.S. PATENT DOCUMENTS

| | | | |
|---|---|---|---|
| 4,822,063 A | 4/1989 | Yopp et al. | |
| 8,892,304 B2 | 11/2014 | Lu et al. | |
| 9,248,822 B2 | 2/2016 | Hyun | |
| 9,791,941 B2 | 10/2017 | Casparian et al. | |
| 9,944,148 B2 | 4/2018 | Villegas Muriel et al. | |
| 11,001,201 B2 | 5/2021 | Weston et al. | |
| 11,279,230 B2 | 3/2022 | O'Rourke et al. | |
| 2002/0175467 A1* | 11/2002 | Dicus | G05G 9/04792 273/148 R |
| 2009/0174226 A1* | 7/2009 | Wettlaufer, Jr. | B60G 21/0555 296/205 |
| 2009/0224493 A1* | 9/2009 | Buma | B60G 17/0162 280/5.511 |
| 2017/0282935 A1* | 10/2017 | Fujimoto | B60W 50/08 |
| 2018/0354336 A1* | 12/2018 | Oakden-Graus | B60G 17/08 |
| 2020/0324649 A1* | 10/2020 | Gully | B60K 17/356 |
| 2021/0155098 A1* | 5/2021 | Ohtomo | B60T 7/102 |
| 2022/0185277 A1* | 6/2022 | Xiao | B60W 50/082 |
| 2023/0241973 A1* | 8/2023 | Battlogg | B60K 35/55 188/267.2 |
| 2023/0356558 A1* | 11/2023 | Taylor | B60G 17/08 |

* cited by examiner

*Primary Examiner* — Toya Pettiegrew
(74) *Attorney, Agent, or Firm* — David B. Kelley; Brooks Kushman P.C.

(57) ABSTRACT

A vehicle includes first and second wheel assemblies, a steering wheel, a driver-actuatable input supported on the steering wheel, and an active stabilizer bar. The stabilizer bar has a first end connected to the first wheel assembly, a second end connected to the second wheel assembly, and a coupler connected between the first and second ends and configured to provide a variable torsion force between the first and second ends. A controller is programmed to, in response to actuation of the driver-actuatable input, command the coupler to modify the torsion force.

17 Claims, 4 Drawing Sheets

FORCE SENSING STEERING WHEEL PADDLES

TECHNICAL FIELD

The present disclosure relates to force sensing steering wheel paddles used to control vehicle systems.

BACKGROUND

Vehicles include a steering wheel for controlling a steering angle of the front wheels. Additional inputs may also be provided on the steering column. Some vehicles include paddle shifters for manually shifting an automatic transmission. In this arrangement, a paddle shifter is typically provided on each side with one for upshifts and one for downshifts.

SUMMARY

According to one embodiment, a vehicle includes first and second wheel assemblies, a steering wheel, a driver-actuatable input supported on the steering wheel, and an active stabilizer bar. The stabilizer bar has a first end connected to the first wheel assembly, a second end connected to the second wheel assembly, and a coupler connected between the first and second ends and configured to provide a variable torsion force between the first and second ends. A controller is programmed to, in response to actuation of the driver-actuatable input, command the coupler to modify the torsion force.

According to another embodiment, a vehicle includes a steering wheel, a driver-actuatable input supported on the steering wheel, and an active suspension system having at least one damper with a variable damping force. A controller is programmed to, in response to actuation of the driver-actuatable input, command the active suspension system to modify the damping force.

According to yet another embodiment, a vehicle includes a steering wheel, a driver-actuatable input supported on the steering wheel, and an active suspension system configured to increase or decrease a ride height of the vehicle. A controller is programmed to, in response to actuation of the driver-actuatable input, command the active suspension system to modify the ride height.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
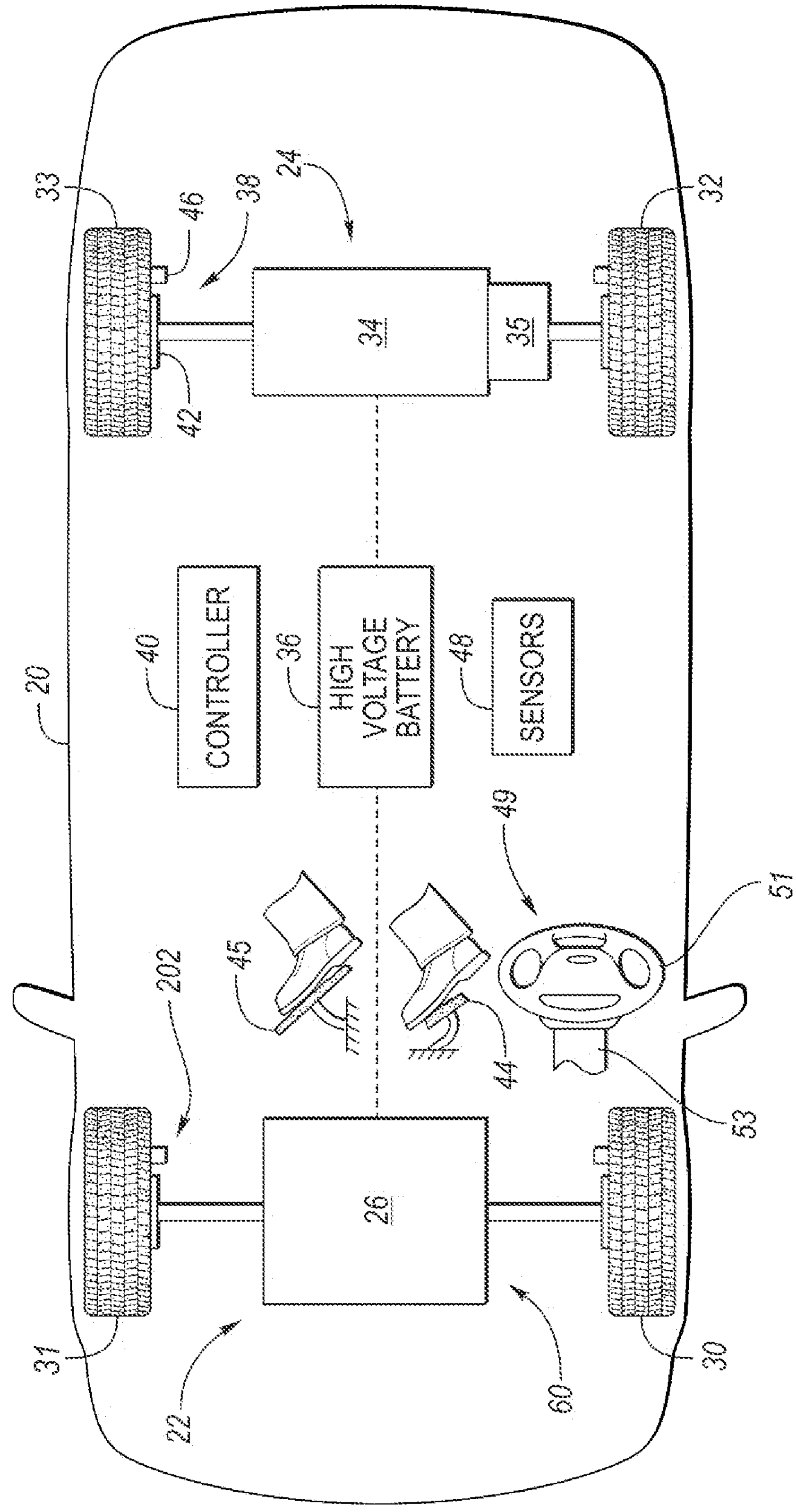
FIG. 1 is a schematic diagram of an electric machine according to one embodiment.

Referring to FIG. 1, a vehicle 20 is illustrated as a fully electric vehicle but, in other embodiments, the vehicle 20 may be a hybrid-electric vehicle that also includes an internal-combustion engine or a conventional vehicle only having an engine. The vehicle 20 may have all-wheel drive (AWD). The vehicle 20 may include a primary drive axle 24 and a secondary drive axle 22. In the illustrated embodiment, the primary drive axle 24 is the rear axle and the secondary drive axle 22 is the front axle. In other embodiments, the front axle may be the primary drive and the rear axle may be the secondary drive. The primary and secondary axles may include their own powerplant, e.g., an engine and/or an electric machine, and are capable of operating independently of each other or in tandem to accelerate (propel) or brake the vehicle 20.

The secondary drive axle 22 may include at least one powerplant, e.g., electric machine 26, operable to power the wheels 30 and 31. A gearbox (not shown) may be included to change a speed ratio between the wheels 30, 31 and the powerplant(s). The gearbox may be a one-speed direct drive or a multi-speed gearbox. The primary drive axle 24 may include at least one powerplant, e.g., an electric machine 34, that is operably coupled to the wheels 32 and 33. A gearbox (not shown) may be included change a speed ratio between the powerplant(s) 34 and the wheels 32, 33.

The electric machines 28, 34 are capable of acting as motors to propel the vehicle 20 and are capable of acting as generators to brake the vehicle via regenerative braking. In one or more embodiments, the electric machines 28, 34 are permanent magnet synchronous alternating current (AC) motors or other suitable type.

The electric machines 28, 34 are powered by one or more traction batteries, such as traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally managed with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

In other embodiments, the vehicle may include a conventional four-wheel drive powertrain. Here, the vehicle includes a front mounted engine and transmission. The transmission is coupled to a transfer case that selectively routes power to the front axle. The transfer case is coupled to the rear axle via a driveshaft and differential. The transfer case is coupled to the front axle via another driveshaft and differential.

The vehicle 20 includes a controller 40 that is in electronic communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data and are stored within the memory. The controller 40 may communicate with other vehicle systems and controllers over one or more wired or wireless vehicle connections using common bus protocols (e.g., CAN and LIN). Used herein, a reference to "a controller" refers to one or more controllers. The controller 40, in one or more embodiments, any include any of the follow control modules: a battery energy control module (BECM) that operates at least the traction battery, an engine control module (ECM) that operates at least the engine, a powertrain control module (PCM) that operates at least the electric machines, the gearboxes, and the differential(s), and an ABS control module that controls the anti-lock braking system (ABS) 38.

The ABS 38, while illustrated as a hydraulic system, may be electronic or a combination of electronic and hydraulic. The ABS 38 may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located on one of the wheels. Each sensor 46 is configured to output a wheel-speed signal to the controller 40 indicative of a measured wheel speed.

The vehicle 20 is configured to slow down using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44 or a hand-operated actuator, or by the controller 40. The aggregator of the controller 40 may be programmed to prioritize regenerative braking whenever possible.

The vehicle 20 includes an accelerator pedal 45. The accelerator pedal 45 includes a range of travel from a released position to a fully depressed position and indeterminate positions therebetween. The accelerator pedal 45 includes an associated sensor (not shown) that senses the position of the pedal 45. The sensor is configured to output a pedal-position signal to the controller 40 that is indicative of a sensed position of the pedal 45. The accelerator pedal 45 is used by the driver to command a desired speed of the vehicle. Under normal conditions, the accelerator pedal 45 is used by the driver to set a driver-demanded torque. The controller 40 may be programmed to receive the pedal-position signal and determine the driver-demanded torque based on pedal position and other factors.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw-rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the front wheels 30, 31. The steering system 49 may include a steering column 53 having a steering wheel 51 connected to a steering shaft that actuates a steering box, such as a rack-and-pinion assembly. The steering box is operably coupled to the front wheels 30, 32 and turns the wheels according to inputs from the steering wheel 51. The steering system 49 may include one or more sensors configured to output a signal indicative of steering angle to the controller 40. The steering sensor may measure rotation of the steering shaft or movement of another component(s).

The vehicle 20 may also include an active suspension system 60 that may include features such as adjustable ride height and/or adjustable stabilizer bars (also known as sway bars and anti-roll bars). The active suspension may be provided at both axles or only one of the axles.

Figure 2:
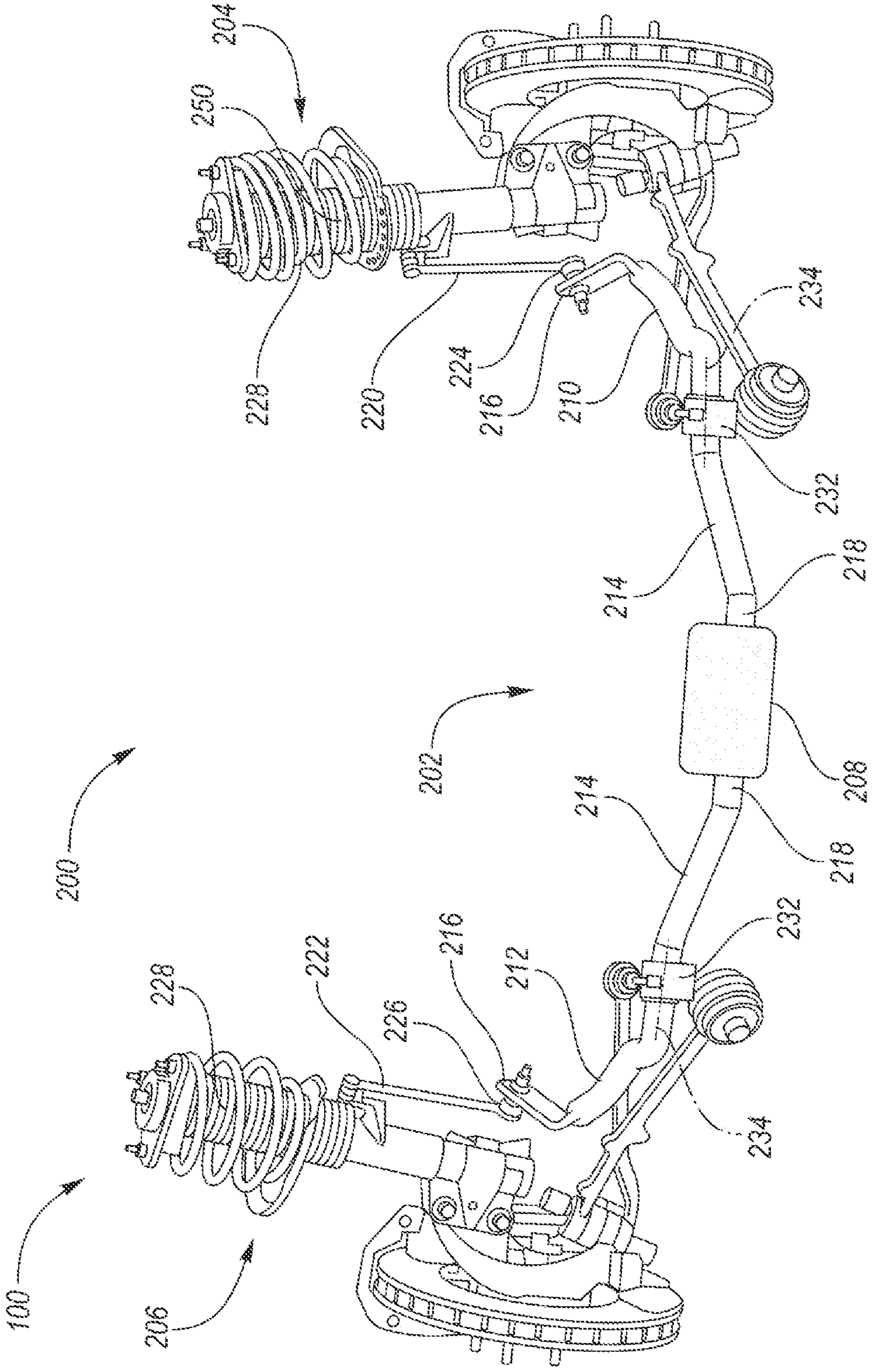
FIG. 2 is an example front axle of the vehicle having an example stabilizer system disclosed herein.

Referring to FIG. 2, stabilizer bars reduce body roll or lean when a vehicle is cornering to increase comfort and/or handling provided by the vehicle. While conventional stabilizer bars reduce body roll during cornering, conventional stabilizer bars can, in some instances, reduce vehicle comfort. For example, conventional stabilizer bars may reduce vehicle comfort when the vehicle traverses uneven terrain (e.g., a bumps, potholes, etc.). Thus, in certain driving conditions, eliminating or reducing the stabilizer-bar effect may add vehicle comfort. Solid stabilizer bars may also be a hinderance during trail driving, particularly rock crawling, as the bars limit articulation and axle travel.

The vehicle 20 may include active stabilizer bars to provide great performance both on- and off-road. Active stabilizer bars may employ electrical or hydraulic systems to vary an effect of the stabilizer bar, e.g., change the torsion. Such electrical and hydraulic systems may employ motors, pumps, actuators and/or hydraulic reservoirs (e.g., hydraulic pumps, etc.), that require either mechanical power directly from an engine or electrical power via an alternator of a vehicle.

The stabilizer system may provide varying damping characteristic(s) (e.g., stiffness characteristics or performances) based on a driving condition of a vehicle. For example, to change ride comfort and/or handling characteristic(s) during different vehicle conditions, the example stabilizer systems disclosed herein vary a stiffness of the stabilizer system to vary an amount of force that transfers between the front wheels and/or between the rear wheels of a vehicle. In particular, the active stabilizer systems may operate in a first mode of operation to provide a stabilizer bar effect (e.g., increase the stabilizer effect), a second mode of operation to substantially eliminate the stabilizer bar effect, and/or a third or an intermediate mode of operation to reduce the stabilizer bar effect. As used herein, the stabilizer bar effect resists body roll caused by centrifugal force during cornering.

To select among the different modes of operation of the stabilizer (e.g., to vary the manner or degree of the transfer of forces between front wheels of a vehicle), the example stabilizer systems may have a rotary damper apparatus. To vary performance characteristic(s) of the stabilizer systems, the stabilizer systems vary a damping characteristic of the rotary damper based on a driving condition of the vehicle. For example, increasing a damping force of the rotary damper apparatus increases a stiffness characteristic(s) of the example stabilizer systems and decreasing a damping force of the damper apparatus decreases a stiffness characteristic(s) of the example stabilizer systems.

An example suspension 202 of the example vehicle 100 of FIG. 1 implemented with an example stabilizer bar system 200 disclosed herein. The suspension 202 of the illustrated example is a front suspension of the example vehicle 100. Although the example stabilizer bar system 200 of FIG. 2 is coupled to the suspension 202 of the vehicle 100, in some examples, the example stabilizer bar system 200 disclosed herein may be implemented with a rear suspension of the vehicle 100. The stabilizer bar system 200 disclosed herein allows the transfer of forces between the front wheels when the vehicle is in a first condition (e.g., a cornering condition) to reduce (e.g., minimize) body roll, and reduces (e.g., minimizes or substantially eliminates) the transfer of forces between the front wheels when the vehicle is in a second condition (e.g., a non-corning condition, when the vehicle is traveling over uneven terrain, bumps, etc.).

The front axle 22 includes left and right wheel assemblies 190 and 192. A stabilizer bar or system 200 connects between the assemblies 190, 192. The stabilizer bar system 200 selectively provides a first mode of operation, a second mode of operation, a third mode of operation as described above. In the first mode, the stabilizer bar system 200 increases a stiffness characteristic of the stabilizer bar system 200 to enable or increase the transfer of forces between a first side 204 of the suspension 202 (e.g., a first side of an axle assembly) and a second side 206 of the suspension 202 (e.g., a second side of an axle assembly) opposite the first side 204 of the suspension 202. In other words, the example stabilizer bar system 200 increases a roll stiffness characteristic of the suspension 202 to reduce, for example, body roll or lean when the vehicle 20 is cornering. In the second and third modes, the stabilizer bar system 200 of the illustrated example reduces (second mode) or substantially prevents the transfer of forces (third mode) between the first side 204 and the second side 206 of the suspension 202. Thus, the greater the degree to which forces are transferred between the first side 204 and the second side 206 when the stabilizer bar system 200 is in the first mode than when the stabilizer bar system 200 is in the second/third modes. In other words, in the first mode, a force generated on one of the sides 204, 206 is efficiently coupled to the other side 204, 206. Such efficiency may approach or equal substantially 100%. In contrast, in the third mode, a force generated on one of the sides 204, 206 is substantially isolated from the other side 204, 206. Such isolation may approach or equal a substantially 0% coupling between the sides 204, 206. Put another way, the stabilizer bar system 200 may provide a variable coupling coefficient (e.g., the ratio of a force output from the stabilizer bar system divided by an input force), which may vary from zero to one for different vehicle operating conditions.

To switch between the modes, the stabilizer bar system 200 of the illustrated example includes a rotary damper system 208 coupled to a first stabilizer bar 210 and a second stabilizer bar 212. Each of the first stabilizer bar 210 and the second stabilizer bar 212 of the illustrated example includes a body 214 defining a first end 216 and a second end 218, respectively. For example, the body 214 of the illustrated example defines an L-shaped profile between the first end 216 and the second end 218. The first end 216 of the first stabilizer bar 210 of the illustrated example operatively couples to the first side 204 of the suspension 202 and the first end 216 of the second stabilizer bar 212 operatively couples to the second side 206 of the suspension 202.

In the illustrated example, a first link 220 couples the first end 216 of the first stabilizer bar 210 to the first side 204 of the suspension 202 and a second link 222 couples the first end 216 of the second stabilizer bar 212 to the second side 206 of the suspension 202. For example, the first end 216 of the first stabilizer bar 210 is pivotally coupled to the first side 204 of the suspension 202 via a first bushing 224 and the first end 216 of the second stabilizer bar 212 is pivotally coupled to the second side 206 of the suspension 202 via a second bushing 226. The first link 220 and the second link 222 may be attached to respective struts 228 (e.g., MacPherson struts) of the suspension 202. In some examples, the first link 220 and/or the second link 222 may be coupled to a shock absorber, a spring, a control arm, a steering knuckle, an axle, the wheel assembly and/or any other portion of the suspension 202, a frame or a subframe of the vehicle 20 without affecting the operation or function of the stabilizer bar system 200 disclosed herein. In some examples, the first link 220 and/or the second link 222 are not provided. In some such examples, the first end 216 of the first stabilizer bar 210 and/or the first end 216 of the second stabilizer bar 212 may couple (e.g., directly attach) to a shock absorber, a spring, a control arm, a steering knuckle, an axle, a wheel assembly and/or any other portion of the suspension, a frame or a subframe of the vehicle 100 without affecting the operation or function of the stabilizer bar system 200 disclosed herein.

The first stabilizer bar 210 and the second stabilizer bar 212 of the illustrated example are rotatably coupled to a frame or subframe of the vehicle 100 via bushings 232. The bushings 232 enable the body 214 of the first stabilizer bar 210 and/or the body 214 of the second stabilizer bar 212 to rotate relative to a rotational axis 234 of the body 214 (e.g., when the first end 216 of the first stabilizer bar 210 and/or the second stabilizer bar 212 is pivoted relative to the vehicle 100).

In the illustrated example, the rotary damper system 208 is positioned between the second end 218 of the first stabilizer bar 210 and the second end 218 of the second stabilizer bar 212. As described in greater detail below, the rotary damper system 208 of the illustrated example is coupled to the first stabilizer bar 210 and second stabilizer bar 212 and varies an amount of or a degree to which force transfers between the first stabilizer bar 210 and the second stabilizer bar 212 based on a condition of the vehicle 100. For example, to enable forces imparted to the first side 204 of the suspension 202 to be conveyed to the second side 206 of the suspension 202 via the first stabilizer bar 210 and second stabilizer bar 212, the rotary damper system 208 prevents relative rotation between the first stabilizer bar 210 and the second stabilizer bar 212. To substantially prevent or reduce transmission of forces between the first side 204 of the suspension 202 and the second side 206 of the suspension 202, the rotary damper system 208 of the illustrated example allows relative rotation between the first stabilizer bar 210 and the second stabilizer bar 212. That is, the first bar 210 and the second 212 may be decoupled from each other. Further details of an active stabilizer system may be found in Applicant's U.S. Pat. No. 9,944,148 (issued Apr. 17, 2018), the contents of which are hereby incorporated by reference in its entirety herein.

The active stabilizer system 200 may be controller by a user of the vehicle by a user, control device, input, or HMI. Example inputs include a bottom, switch, toggle, paddle or the like, which may be count to the steering wheel 51 or column 53.

Figure 3:
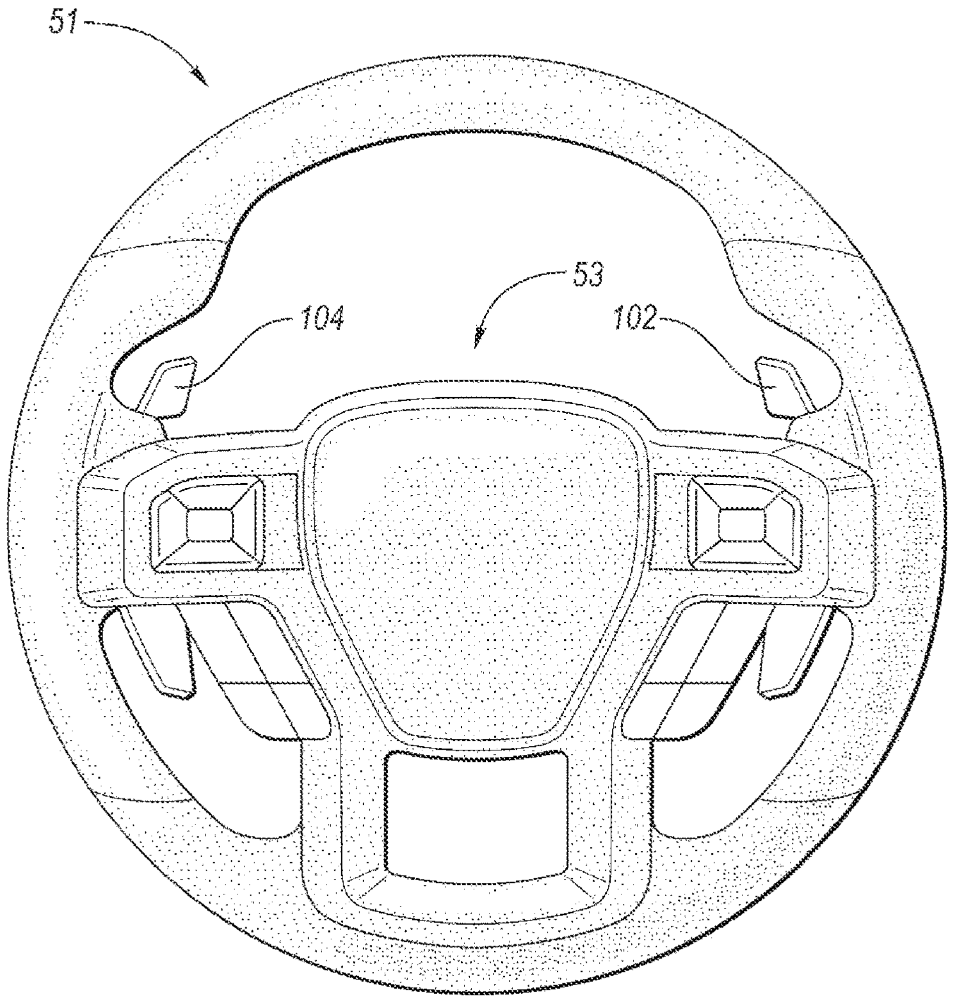
FIG. 3 is a perspective view of a steering wheel having paddle inputs.

Referring to FIG. 3, the control devices may be mounted on a steering wheel 100 or any other location that is easily assessable to the driver. The controls are driver-actuatable inputs operable to request a change in the stabilizer bar 200 or other system as will be described infra. In the illustrated embodiment, the inputs are paddles 102 and 104. The paddles 102 and 104 may be mounted on a backside of the steering wheel 51 or may be mounted to the steering column 53. The paddles 102, 104 each include an associated sensor configured to sense actuation of the paddles and output a signal, e.g., an actuation signal, to the controller 40 indicative of an actuation state of the paddle.

In one embodiment, the paddles are ON/OFF switches that the driver can use to request a change in the stabilizer bar 200. In response to the driver request, the controller 40 executes the stabilizer-bar controls that are discussed infra.

Figure 4:
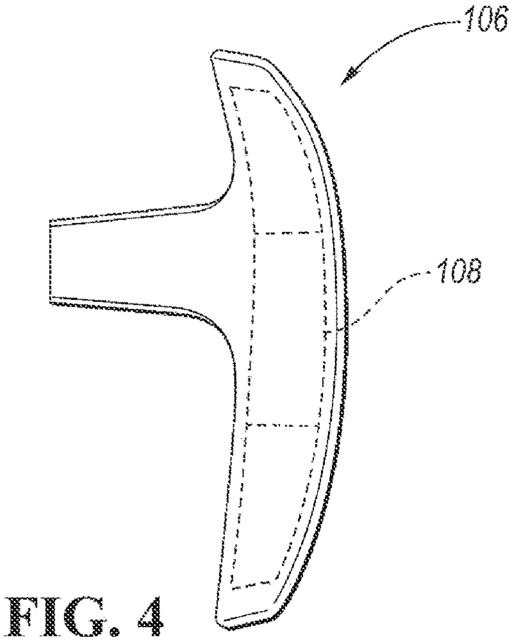
FIG. 4 is a detail view of a paddle according to one or more embodiments.

The paddles or other input may be force sensors rather than a moving input. For example, the paddles 102 and 104 may be stationary and include sensors for actuation. Referring to FIG. 4, an example paddle 106 includes at least one variable-force sensor 108. The force sensor 108 is configured to sense an input force and output a signal indicative that force. In this way, the sensor 108 is configured to differentiate between differently applied forces and output different signals corresponding to the applied force. This allows for variable input control at the paddle 106 rather than a binary on-off switch. The paddle 106 may include more than one force sensor 108 at different locations of the paddle. This allows the driver to control multiple operations on a single paddle. The force sensor(s) may be disposed on a front side of the paddle, a backside of the paddle, or both. The paddle 106 may displace a small amount in some embodiments provide feedback. Additionally, and alternatively, the paddle 106 may provide haptic feedback or the like to indicate actuation of the force sensor 108.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
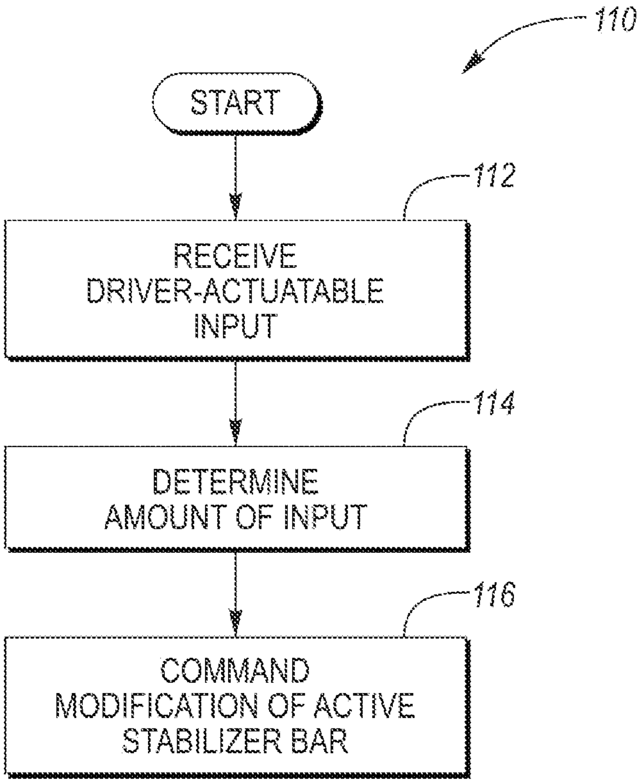
FIG. 5 is a flow chart of an algorithm for controlling an active stabilizer bar.

FIG. 5 is a flowchart 110 of an algorithm for controlling an active stabilizer bar based on inputs from a driver. At operation 112, the controller receives a signal from a driver-actuatable input associated with control of the active stabilizer bar. For example, the signal may be received from a variable force sensor associated with a paddle mounted on the steering column. In operation 114, the controller or some other intermediary correlates the received signal from the sensor with a desired state of the active stabilizer bar. For example, a first force applied to the driver-actuatable input generates a first signal value that corresponds to a torsion force of the active stabilizer bar, and a second, greater, force applied to the driver actuatable input generates a second signal value that corresponds to another torsion force, e.g., lower torsion force, of the active stabilizer bar. This allows the driver to control the amount of engagement or torsion of the stabilizer bar. In this context, more torsion means a greater coupling between the first and second sides of the stabilizer bar. For example, no actuation of the driver-actual input may result in full coupling (a relatively large torsion value) of the active stabilizer bar, and full actuation of the driver-actuatable input may result in decoupling (a zero torsion value) of the active stabilizer bar. (In some embodiments, the active stabilizer bar may not fully decouple.)

Once the controller determines the desired amount of torsion, the controller commands modification of the active stabilizer bar based on the received signal from the driver-actuatable input. Controller may send a signal to the actuator of the active stabilizer bar causing a change in the coupling first and second sides, which modifies a torsion value of the stabilizer bar. For example, the controller may be programmed to, in response to a first force applied to the driver-actuatable input, command the coupler to modify the torsion force to a first value, and, in response to a second force applied to the driver-actuatable input, command the coupler to modify the torsion force to a second, higher value. In one embodiment, a first input (right paddle) may be used to increase the torsion of the stabilizer bar and a second input (left paddle) may be used to decrease the torsion of the stabilizer bar.

Referring back to FIGS. 1 and 2, the suspension 202 may or may not be an active suspension system. In the active embodiment, the suspension 202 includes at least one damper 250 having a variable damping force. For example, the vehicle may have four variable-force dampers or two-variable force dampers. A variable-force damper may have an adjustable compression and/or rebound. The damper 250 may be electronically controlled to adjust the compression and/or rebound.

The vehicle 20 may automatically controlled the compression and/or rebound of the damper(s) 250 based on sensed conditions from various vehicle sensors. Additionally, in some embodiments, the vehicle 20 may allow a driver to manually adjust the compression and/or rebound of the damper(s) 250 using one or more a driver-actuatable inputs, such as the above-described inputs, e.g., paddle 106. Here, force application to the paddle 106 would be calibrated to a damping force and may be communicated as a variable damper force command to control compression and/or rebound using a vehicle dynamics module or chassis control system. The input(s) 106 can be used dried the driver to tune/calibrate damper controls based on vehicle speed, vehicle location, or other input parameters. By using the one or more inputs, e.g., paddle 106, a metric that is to be edited will increase or decrease in value in real time based on actuation of the input. The driver can then perform driving tests to determine whether or not they like user selected calibration, make further modifications as needed, and save the newly modified calibration. This allows the driver to apply custom settings to an existing vehicle damper calibration. These damper calibrations can also be specific to different driving modes as desired by the driver.

Depending upon the number of inputs and whether or not the dampers 250 control compression, rebound, or both, the driver may be able to actuate the inputs to modify the compression, the rebound, or both. For example, in a two-input embodiment, a driver may be able to increase or decrease the compression or rebound using the appropriate input. For example, a right paddle may be used to increase the compression or rebound and the left paddle may be used to decrease the compression or rebound. In a four-input embodiment, the driver may be able to control both compression and rebound. For example, each paddle is configured to provide to inputs. Here, the right paddle may include a first force sensor used to increase compression and a second force sensor used to decrease compression, and the left paddle may include a first force sensor used to increase rebound and a second force sensor used to decrease rebound. On each paddle, the force sensors may be provided as upper and lower or front and back sensor locations. These, of course, are just examples in are not to be interpreted as limiting.

In addition to variable damping force, the active suspension system 200 may also include adjustable ride height allowing the vehicle to raised or lowered relative to the ground. The one or more driver actuatable inputs may be controlled the ride height. For example, actuation of the first input may increase the ride height and actuation of the second input may decrease the ride height.

Figure 6:
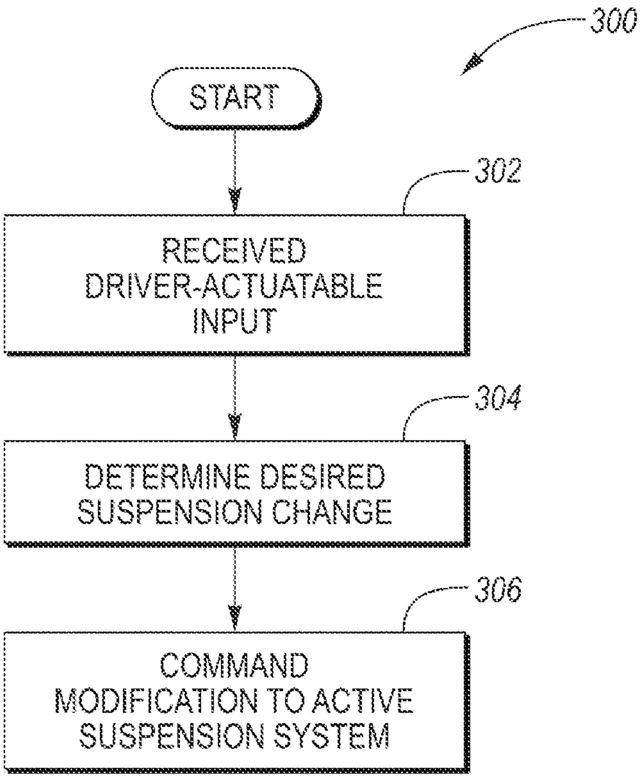
FIG. 6 is a flow chart of an algorithm for controlling an active suspension system.

FIG. 6 illustrates a flowchart 300 of an algorithm for controlling an active suspension system including at least one damper having a variable damping force. At operation 302, the controller receives a signal from one or more of the driver-actuatable inputs, e.g., force sensor 108. A controller or some intermediary reads the signal and determines corresponding modification being requested by the driver at operation 304. The modification may be an increase or decrease in compression or rebound of a damper or may be a modification of the vehicle right height. The controller then commands the active suspension system to modify one or more parameters as requested by the driver.

As explained above, these modifications may be according to the force or pressure applied by the driver to a variable-force sensor. For example, controller may be programmed to, in response to actuation of a first driver-actuatable input, command the active suspension system to increase the damping force and, in response to actuation of a second driver-actuatable input, command the active suspension system to decrease the damping force. The first and second driver-actuatable inputs may paddles each with a variable-force sensor. The controller may be further programmed to, in response to a first force applied to the driver-actuatable input, command a first value of the damping force, and, in response to a second force applied to the driver-actuatable input, command a second value of the damping force. The damping force may relate to compression or rebound, or both. In another example, the controller is programmed to, in response to a signal from the first sensor, command the active suspension system to modify compression of the damper and, in response to a signal from the second sensor, command the active suspension system to modify rebound of the damper.

Ride height may be similarly controlled. For example, the controller may be programmed to, in response to actuation of the driver-actuatable input, command the active suspension system to modify the ride height. The driver-actuatable input may be first and second driver-actuatable paddle inputs with variable-force sensors. The controller may be further programmed to, in response to actuation of the first driver-actuatable input, command the active suspension system to increase the ride height and, in response to actuation of the second driver-actuatable input, command the active suspension system to decrease the ride height.

In another embodiment, the vehicle may include an active aerodynamic system, such as an adjustable spoiler, grill shutters, or splitter that is controllable by the above-described driver-actuatable input. For example, variable pressure applied to a left paddle may cause the controller to reduce downforce and drag, and variable pressure applied to a right paddle may cause the controller to increase downforce and drag.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
first and second wheel assemblies;
a steering wheel;
a driver-actuatable input supported on the steering wheel;
an active stabilizer bar including a first end connected to the first wheel assembly, a second end connected to the second wheel assembly, and a coupler connected between the first and second ends and configured to provide a variable torsion force between the first and second ends; and
a controller programmed to, in response to actuation of the driver-actuatable input, command the coupler to modify the torsion force, wherein the modification of the torsion force is based on a force applied to the driver-actuatable input.

2. The vehicle of claim 1, wherein the controller is further programmed to:
in response to a first force applied to the driver-actuatable input, command the coupler to modify the torsion force to a first value, and
in response to a second force applied to the driver-actuatable input, command the coupler to modify the torsion force to a second value.

3. The vehicle of claim 2, wherein the first force is less than the second force, and the first value is higher than the second value.

4. The vehicle of claim 1, wherein the driver-actuatable input is a paddle.

5. The vehicle of claim 4, wherein the paddle includes a variable-force sensor configured to output a signal of the actuation to the controller.

6. A vehicle comprising:
first and second wheel assemblies;
a steering wheel;
a driver-actuatable input supported on the steering wheel;
an active stabilizer bar including a first end connected to the first wheel assembly, a second end connected to the second wheel assembly, and a coupler connected between the first and second ends and configured to provide a variable torsion force between the first and second ends;
an active suspension system configured to increase or decrease a ride height of the vehicle; and
a controller programmed to:
in response to actuation of the driver-actuatable input, command the coupler to modify the torsion force wherein the modification of the torsion force is based on a force applied to the driver-actuatable input; and
in response to actuation of the driver-actuatable input, command the active suspension system to modify the ride height, wherein the modification of the ride height is based on the force applied to the driver-actuatable input.

7. The vehicle of claim 6, wherein the driver-actuatable input is first and second driver-actuatable inputs, wherein the controller is further programmed to:
in response to actuation of the first driver-actuatable input, command the active suspension system to increase the damping force; and
in response to actuation of the second driver-actuatable input, command the active suspension system to decrease the damping force.

8. The vehicle of claim 7, wherein the first and second driver-actuatable inputs are paddles.

9. The vehicle of claim 6, wherein the driver-actuatable input includes a variable-force sensor.

10. The vehicle of claim 8, wherein the controller is further programmed to:
in response to a first force applied to the driver-actuatable input, command a first value of the damping force, and
in response to a second force applied to the driver-actuatable input, command a second value of the damping force.

11. The vehicle of claim 6, wherein the driver-actuatable input includes a first variable-force sensor and a second variable-force sensor, and wherein the controller is further programmed to:
in response to a signal from the first sensor, command the active suspension system to modify compression of the damper; and
in response to a signal from the second sensor, command the active suspension system to modify rebound of the damper, wherein the signal from the first sensor is based on a first force applied to the first variable force sensor and the signal from the second sensor is based upon a second force applied to the second variable-force sensor.

12. The vehicle of claim 6, wherein the driver-actuatable input is first and second driver-actuatable inputs, and wherein the controller is further programmed to:
in response to a signal from the first input, command the active suspension system to modify compression of the damper; and
in response to a signal from the second input, command the active suspension system to modify rebound of the damper, wherein the signal from the first sensor is based on a first force applied to the first driver-actuatable input and the signal from the second sensor is based upon a second force applied to the second driver-actuatable input.

13. The vehicle of claim 6, wherein the first and second driver-actuatable inputs are paddles.

14. The vehicle of claim 13, wherein the driver-actuatable input is first and second driver-actuatable inputs, wherein the controller is further programmed to:
in response to actuation of the first driver-actuatable input, command the active suspension system to increase the ride height; and
in response to actuation of the second driver-actuatable input, command the active suspension system to decrease the ride height.

15. A vehicle comprising:
a steering wheel;
a driver-actuatable input supported on the steering wheel;
an active suspension system configured to increase or decrease a ride height of the vehicle; and
a controller programmed to, in response to actuation of the driver-actuatable input, command the active suspension system to modify the ride height, wherein the modification of the ride height is based on a force applied to the driver-actuatable input.

16. The vehicle of claim 15, wherein the driver-actuatable input is first and second driver-actuatable inputs, wherein the controller is further programmed to:

in response to actuation of the first driver-actuatable input, command the active suspension system to increase the ride height; and in response to actuation of the second driver-actuatable input, command the active suspension system to decrease the ride height.

17. The vehicle of claim 1, the modification of the torsion force is such that the torsion force increases as the force applied to the driver-actuatable input increases.

* * * * *